United States Patent [19]

Kerlin

[11] Patent Number: 4,501,947
[45] Date of Patent: Feb. 26, 1985

[54] ELECTRIC ARC UNBALANCE CORRECTION SYSTEM

[76] Inventor: Jack H. Kerlin, 1722 Sanford Place, Ann Arbor, Mich. 48103

[21] Appl. No.: 561,768

[22] Filed: Dec. 15, 1983

[51] Int. Cl.³ ............................................ B23K 37/00
[52] U.S. Cl. ...................................... 219/68; 73/460; 219/130.4
[58] Field of Search ............ 219/68, 69 M, 69 C, 219/130.4; 73/66, 460, 466, 468, 469

[56] References Cited

U.S. PATENT DOCUMENTS

| | | | |
|---|---|---|---|
| 2,322,561 | 6/1943 | Bevins et al. | 219/69 M |
| 2,784,349 | 3/1957 | Anderson | 219/130.4 |
| 2,867,730 | 1/1959 | Welch | 219/130.4 |
| 3,259,729 | 7/1966 | Mürtz et al. | 219/68 |
| 3,876,855 | 4/1975 | Hirasawa et al. | 219/130.4 |
| 4,119,829 | 10/1978 | Bakardjiev et al. | 219/130.4 |

Primary Examiner—Clifford C. Shaw
Attorney, Agent, or Firm—Stephenson and Boller

[57] ABSTRACT

An unbalance correction system is disclosed for balancing a workpiece while it rotates in a conventional balancing machine. Stock removal occurs simultaneously with unbalance measurement. State of balance is continuously monitored while correction proceeds. The trial and error aspect in conventional methods of alternating between measurement and correction operations is eliminated, resulting in a higher precision balance in reduced procedure time. Stock is removed by discharging capacitors across a gap formed between the spinning workpiece and stationary electrodes. The momentary high-current arc melts and vaporizes material during only a portion of a total revolution. The discharge is triggered by a vibration induced signal from the balancing machine when the heavy spot is adjacent the electrodes.

6 Claims, 2 Drawing Figures

ELECTRIC ARC UNBALANCE CORRECTION SYSTEM

BACKGROUND AND SUMMARY OF THE INVENTION

This invention relates generally to the creation of an electric arc across an air gap and more specifically to a new and improved means to initiate an electric arc discharge which is sustained and augmented by a large power supply. The invention is disclosed in the context of an unbalance correction system.

In recent years advances in electronic vibration measurement equipment have made possible accurate determination of the amount and location of minute unbalance in rotating elements such as gyroscope rotors and small turbine wheels. Such rotating elements are often required to be balanced to levels approaching the limits of the measuring equipment. But while it is possible to electronically measure the quantity of material creating unbalance, no means has yet been devised for physically removing the exact minute amounts indicated. Consequently trial and error correction is employed. An estimated amount of stock is removed manually by milling, grinding, or by electrochemical methods. Unbalance is then measured to determine the effect of the correction and how much unbalance remains. This two-step process of alternate correction and measurement continues until an acceptable state of balance is attained.

Ideally, correction should occur simultaneously with measurement in a single operation. By continuously monitoring the effect of gradual stock removal lower levels of unbalance can be achieved in less time.

Rotating elements not requiring critical balancing would also benefit from such an ideal in-process balancing system in cases where controlled stock removal methods such as drilling or welding metal strip are not suitable. Even when controlled correction methods are utilized, in-process balancing may function for trim balancing to a precision not otherwise attainable except by the trial and error method previously described.

The present invention in one respect relates to a new and improved unbalance correction system wherein correction is attained by electric arc discharge through a heavy spot on a rotating mass to remove material from the heavy spot by vaporization.

The concept of starting an arc with a superimposed high voltage has long been utilized in automatic arc welding equipment. As applied in the balancing field the principle is found in prior art U.S. Pat. No. 2,322,561 which indicates use of high voltage to initiate a low voltage capacitor discharge across an air gap for stock removal purposes.

The invention herein claimed constitutes a new and improved means for triggering discharges across an air gap which finds particular utility for in-process balancing operations.

More specifically, it provides in-process correction of unbalance by means of periodic electrical discharges occurring between stationary electrodes and a workpiece rotating in a balancing machine of conventional design. Heat generated by the high-current arc so formed melts and vaporizes stock from the heavy spot of the workpiece. Each discharge results in an incremental reduction of unbalance and proceeds automatically to a minimal level of unbalance. The residual unbalance corresponds at most to the amount of material removed per discharge. Unbalance will never exceed this minimal level because the location of unbalance will change as soon as over-correction occurs. Thus it is impossible to over-shoot, and the system is inherently self-limiting once the minimal level is reached.

In the preferred embodiment, two electrodes are positioned in close proximity to the workpiece and to each other. The electrodes are designated positive and negative and are connected via a heavy cable to positive and negative terminals respectively of a capacitor bank without any intervening switching devices. An electrical circuit is completed from the positive to the negative electrode by imposition of the workpiece which functions as an intermediate passive conductor. This circuit comprises the workpiece and the air gap which exists on opposite sides of the workpiece, the electrodes being spaced from the workpiece.

Discharge of the capacitor bank occurs in response to a signal from the balancing machine's electronic vibration measurement instrument. This signal is synchronous with vibration from the unbalanced workpiece and is phase adjustable to time the discharge when the heavy spot is immediately adjacent the electrodes. A repeat cycle timer permits discharges to occur at spaced intervals rather than once per revolution to permit recharging time of the capacitor bank.

Initial breakdown of the gap typically requires over 10,000 volts. The capacitors of the capacitor bank however are typically charged to only several hundred volts. Once breakdown of the gap has been initiated, only about 50 volts is required across the gap to sustain the high current flow. Breakdown is initiated by superimposing a high breakdown voltage upon the low-voltage/high-current main arc circuit to establish an ionized path across the gap. The invention provides a means for developing and applying such a high voltage to the gap to initiate breakdown and allow for the subsequent discharge of the capacitors to sustain and augment the electric arc. Once started the discharge is self-sustaining until the capacitor bank charge voltage is lowered to the gap maintaining potential of about 50 volts.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
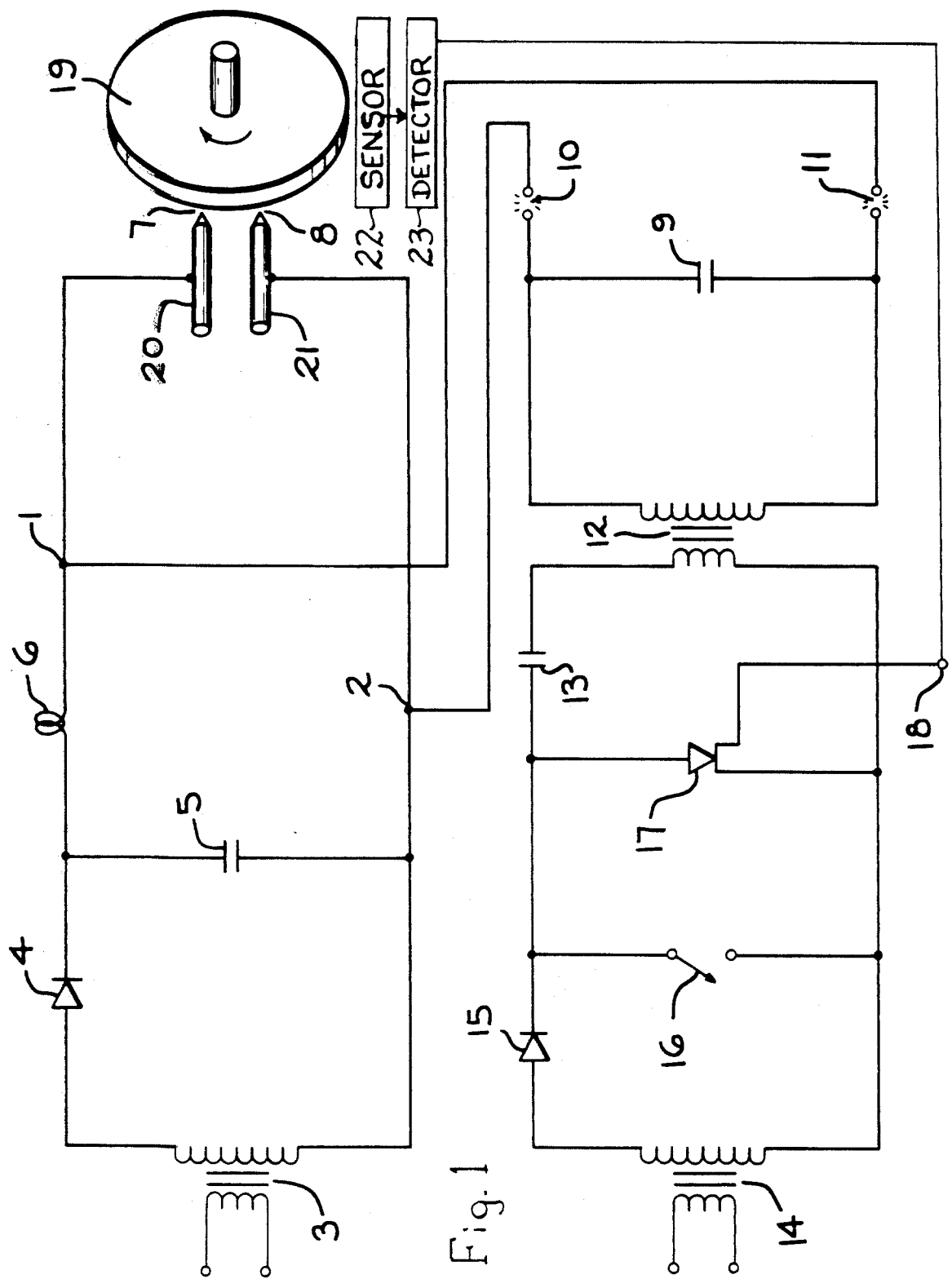
FIG. 1 is an electrical schematic diagram illustrating general principles of the present invention in one particular embodiment.

Reference to FIG. 1 shows an electric arc unbalance correction system embodying principles of the present invention.

In principle, a high voltage, high frequency pulse is injected directly into a main discharge circuit at points 1 and 2. The main discharge circuit comprises a charging transformer 3, a rectifier 4, a capacitor bank 5, an inductor coil 6, work gaps 7 and 8, and a workpiece 19. The workpiece is rotatable about an axis of rotation as indicated by the drawing figure.

A portion of the injected pulse current is compelled to complete a circuit across work gaps 7 and 8 rather than short circuit through the power supply provided by capacitor 5. Such short circuiting is inhibited because inductor coil 6 is formed from only several turns of heavy conductor and placed in series with capacitor 5 and gaps 7 and 8, specifically being interposed between capacitor 5 and the point of pulse injection at 1. Due to the high frequency of the pulse, the relatively low self-inductance of coil 6 is sufficient to block or "choke" a portion of the pulse current. Self-inductance of coil 6 must be kept low to prevent choking a rapid discharge of capacitor 5, to minimize voltage reversal of capacitor 5, and to eliminate resistance damping otherwise necessary to avoid voltage reversal.

The high frequency pulse is generated by an arc discharge initiating circuit which comprises a low capacitance capacitor 9 as well as a pair of gaps 10 and 11 in the conductors leading to points 1 and 2. Capacitor 9 is charged to the combined breakdown voltage of gaps 10, 11, 7 and 8, typically about 20,000 volts. Upon breakdown, capacitor 9 discharges through the circuit containing gaps 10, 11, 7, 8. The combined low capacitance and low inductance of this circuit gives it a natural high-frequency of oscillation to thereby produce a current of such high frequency so as to be effectively blocked by inductor coil 6.

In a preferred embodiment of the invention capacitor 9 is charged by a high voltage transformer 12. In order to create discrete high voltage/high frequency pulses, transformers 12 is pulsed by discharging a capacitor 13 through the primary of transformer 12. Discharge of capacitor 13 may be controlled by a manual switch 16 or an SCR 17 triggered by a signal input 18 from the balancing instrument. Capacitor 13 is itself charged by a transformer 14 via a rectifier 15.

Electrodes 20 and 21 obviate the necessity of electrifying the workpiece 19 as would be the case if only a single electrode were used per balancing plane. For two plane balancing two sets of dual electrodes are employed.

Based upon this description of FIG. 1 it can be appreciated that capacitor bank 5 is repetitively discharged and recharged during the operation of the system. The recharging of capacitor bank 5 takes place from transformer 3 via diode 4. Recharging of the capacitor bank may require a time interval longer than one revolution of workpiece 19. Hence, the discharge across gaps 7 and 8 to remove material from workpiece 19 may, and indeed most likely will, occur on a basis other than once per revolution. Because the voltage to which capacitor bank 5 is charged is less than the voltage required to breakdown gaps 7 and 8, the only means of initiating the discharge is via the arc discharge initiating circuit.

Where workpiece 19 is provided with a heavy spot, the system operates so that the electric arc discharge is effective on the heavy spot to vaporize a certain amount of material from the heavy spot for each discharge of capacitor bank 5. The balancing instrument may contain a sensor 22 and a detector 23 which is so adjusted that the phase of the trigger signal applied to terminal 18 is delivered at the appropriate time to cause the arc discharge to occur across the heavy spot. A timer or other means may be associated with the control to prevent triggering signals from being given by the arc initiating circuit every rotation of workpiece 19, but this will depend upon how rapidly capacitor bank 5 can be recharged in relation to the speed of rotation of the workpiece. The system operates such that a certain amount of material is removed from the workpiece each time that an arc discharge occurs.

By providing the workpiece with a heavy spot, there will be a noticeable change in the location, or phase, of imbalance as the removal of material from the heavy spot passes through a condition of balance. When this occurs the balancing instrument detects it and is operable to terminate further arc discharges. Because each arc discharge is effective to remove a certain amount of material from the workpiece, the system provides a result whereby the final amount of imbalance will be at most the amount of material which is vaporized by one arc discharge. This can be very small so that a high degree of balance is achieved. Hence, the trial and error procedure referred to above in prior techniques may be eliminated.

Figure 2:
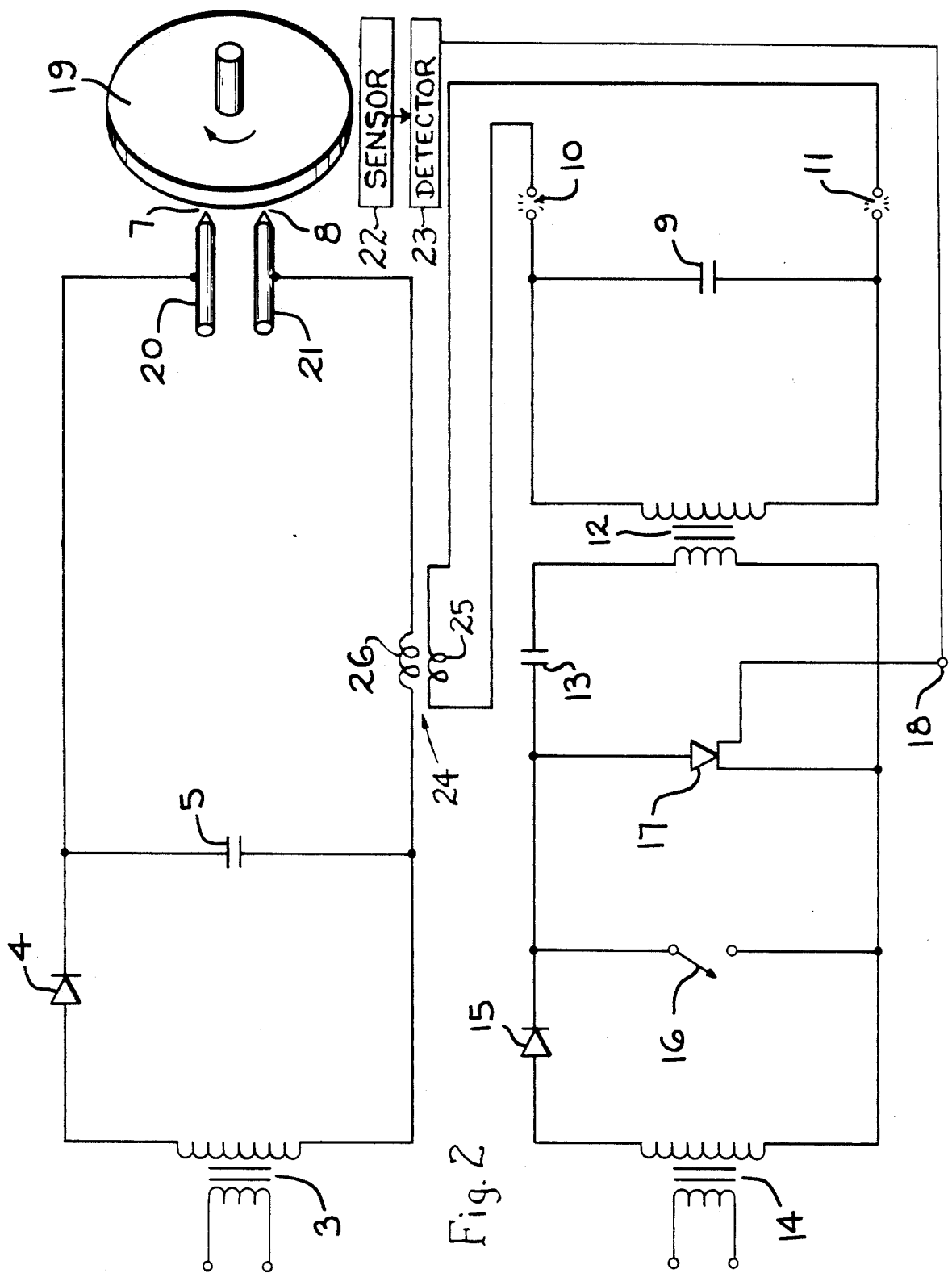
FIG. 2 is an electrical schematic diagram illustrating general principles of the present invention in another embodiment.

FIG. 2 illustrates another embodiment containing principles of the present invention. In this embodiment an air core transformer 24 serves to couple the arc discharge initiation circuit with the main discharge circuit from capacitor bank 5 to the electrodes.

The arc discharge initiation circuit is effective on the primary 25 when activated by the balancing instrument to cause the high-voltage, high-frequency pulse to be induced in the secondary winding 26 of the transformer so as to appear across the electrodes 20, 21. The operation of the circuit is the same as that described above for the embodiment of FIG. 1 in that each arc discharge is effective to vaporize a certain amount of the heavy spot. The air core transformer version is useful in that capacitor bank 5 appears substantially as a dead short to the pulse so that substantially all of the pulse is caused to appear across electrodes 20 and 21. The secondary has a low resistance, low inductance like inductor coil 6 of FIG. 1 so as not to impede the main discharge from capacitor bank 5.

While the use of direct high frequency pulse injection to initiate gap breakdown has been described herein as applied to the balancing art, there may be other applications for this aspect of the invention unrelated to balancing. The controls for the described balancing process are described only generally since the invention does not depend upon any specific details of any particular control. Specific values for the circuit components will depend upon each particular application and can be developed by using conventional design calculations.

While a preferred embodiment of the invention has been disclosed, it will be appreciated that principles are applicable to other embodiments.

What is claimed is:

1. An electric arc unbalance correction system for correcting an unbalanced rotatable mass by electric arc removal of material from the mass, said system comprising electrode structure defining an air gap within which a portion of an unbalanced mass is disposed and via which an electric arc is delivered to remove material from the unbalanced mass while mass is being rotated, a capacitor bank power supply, coupling circuit means operatively coupling said capacitor bank power supply with said electrode structure for supplying electric current from the discharge of said capacitor bank via said electrode structure across the gap to remove material from the unbalanced mass, said capacitor bank power supply being incapable by itself of initiating electric arc discharge across the gap but being capable of sustaining and augmenting electric arc discharge across the gap once initiated, and an arc discharge initiation circuit operatively coupled with said coupling circuit means for producing a high-voltage, high-frequency pulse which is effective to initiate electric arc discharge across the gap so that said capacitor bank power supply can become effective to sustain and augment the discharge thereby removing material from the unbalanced mass, said coupling circuit means comprising a low resistance conductor between said capacitor bank and said electrode structure including several turns forming a low inductance choke coil but being free of other electrical circuit components, said choke coil being effective to prevent said capacitor bank power supply from impairing the effectiveness of said arc discharge initiation circuit yet allowing said capacitor bank power supply to sustain and augment the electric arc discharge without any substantial impediment of current flow, and means for causing said arc discharge initiation circuit to inject a high-voltage, high frequency pulse directly across the gap when a heavy spot of the unbalanced mass is disposed at the gap.

2. An electric arc unbalance correction system as set forth in claim 1 in which said arc discharge initiation circuit is operatively coupled with said coupling circuit means via air.

3. An electric arc unbalance correction system as set forth in claim 2 in which said arc discharge initiation circuit comprises a coil and the air coupling of the arc discharge initiation circuit with said coupling circuit means comprises mutual coupling between both said coils.

4. An electric arc unbalance correction system as set forth in claim 3 in which said arc discharge initiation circuit comprises a high frequency oscillator circuit which is effective to provide a high-voltage, high-frequency pulse for initiating the discharge.

5. An electric arc unbalance correction system as set forth in claim 1 in which said arc discharge initiation circuit is operatively coupled with said coupling circuit means via electrical conductors containing plural air gaps.

6. An electric arc unbalance correction system as set forth in claim 1 in which said arc discharge initiation circuit comprises a pair of conductors connected to said coupling circuit, and each containing an air gap.

* * * * *